UNITED STATES PATENT OFFICE 2,388,947

DRYING OIL SUBSTITUTE AND METHOD OF MAKING THE SAME

Carlisle H. Bibb and Robert C. Palmer, Pensacola, Fla., assignors to Newport Industries, Inc., Pensacola, Fla., a corporation of Delaware No Drawing. Application November 25, 1942, Serial No. 466,922

3 Claims. (Cl. 260—666)

This invention relates to a drying oil substitute and to a method for making the same by the pyrolytic treatment of terpene hydrocarbons.

We have found that a drying oil substitute and varnish polymer can be satisfactorily prepared by the pyrolysis of terpene hydrocarbons. The pyrolysis is preferably effected by a submerged incandescent element, such as a hot electrical resistance wire. Simultaneously with the formation of a polymer, distillation of volatile components originally present or formed by thermal decomposition, takes place. Those of the volatile components that are condensable may be condensed as by means of a reflux condenser, returned to the reaction vessel and resubjected to pyrolysis. The pyrolysis is continued until a substantial amount of the polymer has been formed. The polymer is then recovered by distilling off the more volatile portions.

The product so obtained is believed to be a polymerization product of unsaturated hydrocarbons formed by the pyrolytic treatment of the terpenes as described. It is recovered as a dark colored, oily liquid, which dries to a pale colored film. It may be used as a drying oil substitute in the preparation of varnishes, or as what is referred to as a varnish polymer. With no drier, our drying oil substitute dries overnight to a tough, dust-free film, while with a conventional proportion of a drier it dries in four hours.

It is therefore an important object of the present invention to provide a novel drying oil substitute from terpene hydrocarbons.

Another important object of the present invention is to provide a method for preparing a drying oil substitute from terpene hydrocarbons.

A further object of this invention is to provide a method for preparing a drying oil substitute from terpene hydrocarbons by pyrolytic decomposition and polymerization.

Other and further objects of the present invention will become apparent from the following description and appended claims.

In proceeding according to the present invention, terpene hydrocarbons are subjected to the pyrolytic action of an incandescent element immersed in the terpene hydrocarbons. The heating medium may be an electrical resistance element formed of Nichrome wire, other metals, such as iron, platinum, nickel, tungsten, tantalum and various alloys. The metals are used primarily because they are conductors of electricity and not because of any special chemical or catalytic effect that they may have. The heating element may be surfaced with glass or carbon, for example, and function equally as well.

Similarly, instead of connecting the heating element to a source of direct or alternating current, a type of heating element may be employed that can be heated by induction. Gas or oil fired tubes might likewise be used in place of an electrically heated element, although not nearly so conveniently or efficiently.

The temperature range for the heating element is broad. The reaction is in progress at the first visible red heat, and has been found to be proceeding up to the point at which a platinum element started to melt. For the purposes of this specification and claims, the temperature range is defined as that range which causes the element to have a visible glow, viz., is incandescent in the broadest sense.

The nature of the hydrocarbons used as starting material affects the yield, some terpene hydrocarbons giving larger yields of the drying oil substitute than others. The formation of the polymer is apparently highest when the group of terpene hydrocarbons comprising terpinolene, terpinene and alpha pinene is selected, and lowest in the case of the group comprising dipentene and beta pinene. For the purpose of this specification and the claims, the term "terpene hydrocarbon" is meant to include all of those hydrocarbons belonging to a terpene class, whether they are monocyclic, bicyclic, or acyclic.

When the reaction has been completed, the generator residue is recovered in the form of a dark colored material containing, besides the polymerization products which make up the drying oil substitute of this invention, more or less of the terpene hydrocarbon material used as a starting material, together with relatively larger amounts of aromatic hydrocarbons, isomerized terpene hydrocarbons, and high boiling products of the pyrolytic treatment.

The polymerized material constituting the drying oil substitute may be isolated by distilling off the more volatile fractions present in the generator residue, preferably by means of steam, or under reduced pressure. When so isolated, and also when dissolved in a suitable solvent, the polymerized material may be used in place of linseed oil in coating compositions for decorative or protective purposes.

The following will serve as an example of the preparation of the drying oil substitute from a commercially available terpene hydrocarbon. It should be understood that the process and apparatus described are merely for the purposes of illustration and that the invention is not to be considered as limited to the details given in the example.

Example

The apparatus used consisted of a steel vessel of 127 gal. total capacity, provided with a fractionating column 21 inches in diameter and 12 feet long. The column was filled for 11 feet of its length with ½ inch clay saddles and contained four pancake coils with tap water connections at the top as a reflux condenser.

The steel vessel was fitted with a heating element which consisted of 68 inches of No. 5 Nichrome wire connected across two heavy copper leads, which were sufficiently long to permit the heating element, in coil form, to be held near the bottom of the vessel, while the upper ends of the copper leads projected out through the top of the vessel and were there held by insulating collars. The leads were connected to a controlled source of electrical current of from 30 to 40 volts and from 250 to 300 amperes.

Fifty-four gallons of a commercial terpene hydrocarbon mixture containing dipentene, terpinenes, terpinolene and small amounts of other similar hydrocarbons, were charged into the vessel. 31 volts were then applied to the heating element and water turned on the pancake coils. As soon as the charge was boiling, 37 volts were applied to the heating element, causing a current of 275 amperes to flow through the element and thus elevate the temperatures of the Nichrome wire to above 475° C.

The volume of residual product in the reaction vessel after a run of some 6 to 8 hours was 17 gallons. This residual product, either with or without subjection to further pyrolytic action, was substantially freed from the more volatile non-drying hydrocarbons present therein by steam distillation at temperatures of from about 150 to 170° C. giving 8 gallons of drying oil substitute of the present invention.

It is not economically feasible to carry the pyrolysis until all of the terpene content is converted to a polymer residue. The polymer itself is subject to some decomposition. It is best, therefor, to stop the pyrolysis after a substantial portion of the varnish polymer has been formed and then distill off the more volatile portion by means of steam. This volatile portion may be condensed and resubjected to pyrolysis.

The varnish polymer does not properly exhibit its drying properties in the presence of the more volatile portion, so must be recovered substantially free from such volatile portion. Apparently there are intermediate decomposition products which either inhibit the drying of the true polymer residue or in themselves are non-drying and, therefore, act as non-drying diluents of the polymer residue.

The polymer produced by pyrolysis of terpenes is easily distinguishable from terpene dipolymer prepared by the catalytic treatment of terpenes. The terpene dipolymer so prepared has, in general, a specific gravity of about 0.94 in the refined state, a boiling range at atmospheric pressure of from 305 to 375° C., and a refractive index, $D_{20°}$, of 1.520. Our product, on the other hand has a specific gravity exceeding 0.97 at $15/40°$ c. and a refractive index exceeding 1.54. By way of example, several samples of our product showed, respectively, specific gravities of 0.989, 0.978 and 1.005, with refractive indices of 1.571 and 1.557. Furthermore, our polymer is not distillable by dry distillation at atmospheric pressure without substantial decomposition and destruction of the product.

It will, of course, be understood that various details of this invention may be varied through a wide range without departing from the principles of this invention, and it is therefore not the purpose to limit the patent granted hereon otherwise than necessitated by the scope of the appended claims.

The amount of more volatile portion of the pyrolysis product removed may vary over a wide range, being dependent on how far the pyrolysis was carried and on the rate of drying desired in the drying oil. If a light pyrolysis was made, more could be taken out than when the pyrolysis was prolonged. In general, the greater amount of more volatile portion removed, the faster the drying of the residue becomes.

The term "polymer," used in this specification and claims, is meant to include true polymers and other high molecular weight hydrocarbons comprising the product of this invention.

We claim as our invention:

1. A liquid drying oil substitute consisting of the polymerized fraction of a product derived from terpene hydrocarbons by thermal decomposition in liquid phase by an incandescent element, said drying oil substitute having a specific gravity at $15/40°$ c. of at least 0.97 and a refractive index $D_{20°}$ of at least 1.54 and being not distillable by dry distillation without decomposition at atmospheric pressure.

2. The method of preparing a drying oil substitute, which comprises thermally decomposing a terpene hydrocarbon by an incandescent element submerged in a liquid body of said hydrocarbon and thereafter distilling off volatile portions from the residue thus obtained to recover a polymerized oily fraction capable of drying by oxidation.

3. The method of preparing a drying oil substitute by the pyrolysis of terpene hydrocarbons, which comprises subjecting a terpene hydrocarbon to thermal decomposition by means of an incandescent element immersed in a liquid body of such terpene hydrocarbon until a substantial proportion of polymer has been formed, steam distilling the resulting mass at a temperature of between 150 and 170° C. to remove portions volatile under those conditions, and recovering as residue an oily polymer having a specific gravity at $15/40°$ c. of at least 0.97 and a refractive index, $D_{20°}$, of at least 1.54.

CARLISLE H. BIBB.
ROBERT C. PALMER.